US009851007B2

(12) United States Patent
Le Lay et al.

(10) Patent No.: US 9,851,007 B2
(45) Date of Patent: Dec. 26, 2017

(54) METHOD FOR EDGING COMPOSITE PANELS, STRIP FOR IMPLEMENTING THE METHOD AND PANEL OBTAINED BY THIS METHOD

(71) Applicant: LES STRATIFIES, Paris (FR)

(72) Inventors: Loïc Le Lay, Acq (FR); Laurent Baclet, Belleu (FR); Julien Scagnetti, Maignelay-Montigny (FR)

(73) Assignee: LES STRATIFIES, Paris (FR)

( * ) Notice: Subject to any disclaimer, the term of this patent is extended or adjusted under 35 U.S.C. 154(b) by 0 days.

(21) Appl. No.: 14/899,937

(22) PCT Filed: Jun. 12, 2014

(86) PCT No.: PCT/IB2014/062169
§ 371 (c)(1),
(2) Date: Dec. 18, 2015

(87) PCT Pub. No.: WO2014/203128
PCT Pub. Date: Dec. 24, 2014

(65) Prior Publication Data
US 2016/0146349 A1 May 26, 2016

(30) Foreign Application Priority Data
Jun. 20, 2013 (FR) ..................................... 13 55837

(51) Int. Cl.
*B29C 65/50* (2006.01)
*B29C 65/52* (2006.01)
(Continued)

(52) U.S. Cl.
CPC ............... *F16J 15/04* (2013.01); *B27D 5/00* (2013.01); *B27D 5/003* (2013.01); *B64C 1/12* (2013.01);
(Continued)

(58) Field of Classification Search
USPC ....................................... 156/247, 249, 289
See application file for complete search history.

(56) References Cited

U.S. PATENT DOCUMENTS 3,011,932 A    12/1961   Downing
5,439,549 A *   8/1995   Fryc .................... B29C 63/0039
                                                                                           156/201

(Continued)

FOREIGN PATENT DOCUMENTS

DE      23 57 051 A1    5/1975
EP      2 145 755 A1    1/2010
(Continued)

OTHER PUBLICATIONS

English Abstract of JP 09-060189 (Mar. 3, 2017).*
(Continued)

*Primary Examiner* — Sing P Chan
(74) *Attorney, Agent, or Firm* — Christensen O'Connor Johnson Kindness PLLC

(57) ABSTRACT

The aim of the invention is to propose an edging method that is quick, effective, easy to implement and makes it possible to obtain a lightweight panel. To this end, the aim of the invention is a method for sealingly edging a composite panel comprising; *a step (a) of providing a composite panel of redefined thickness having two planar faces and a side to be edged, and of providing a sealing strip made from a polymer material having a width greater than the thickness of the composite panel, and comprising a first face, referred to as the "inner" face, and a second face, referred to as the "outer" face, in reference to the position of use of same: *a step (b) of applying the strip and an adhesive to the side and to a peripheral portion of the planar faces of the composite panel in such a way that the adhesive is located between the composite panel and the inner face of the strip, which sealingly protects the composite panel against dust, foreign bodies and the absorption of moisture.

9 Claims, 1 Drawing Sheet

(51) Int. Cl.
    *B32B 37/12*     (2006.01)
    *B32B 37/22*     (2006.01)
    *B32B 38/10*     (2006.01)
    *B32B 43/00*     (2006.01)
    *F16J 15/04*     (2006.01)
    *B27D 5/00*     (2006.01)
    *B64C 1/12*     (2006.01)
    *B64C 1/18*     (2006.01)
    *B64C 1/00*     (2006.01)

(52) U.S. Cl.
    CPC ........ *B64C 1/18* (2013.01); *B64C 2001/0072* (2013.01)

(56) References Cited

U.S. PATENT DOCUMENTS

| | | | | |
|---|---|---|---|---|
| 5,591,509 A | * | 1/1997 | Lorenz | A63C 5/12 280/600 |
| 6,187,409 B1 | * | 2/2001 | Mathieu | B28B 19/0092 428/119 |
| 2011/0067799 A1 | * | 3/2011 | Mussig | A61L 15/58 156/94 |

FOREIGN PATENT DOCUMENTS

| | | | |
|---|---|---|---|
| FR | 81 02535 A1 | 3/1982 | |
| JP | 09060189 A | * 3/1997 | ............... E04C 2/26 |
| WO | 99/14449 A1 | 3/1999 | |

OTHER PUBLICATIONS

Machine translation of JP 09-060189 (Mar. 3, 2017).*
Written Opinion of the International Searching Authority dated Aug. 7, 2014, issued in corresponding International Application No. PCT/IB2014/062169, filed Jun. 12, 2014, 9 pages.
International Preliminary Report on Patentability dated Dec. 22, 2015, issued in corresponding International Application No. PCT/IB2014/062169, filed Jun. 12, 2014, 1 page.
International Search Report dated Aug. 7, 2014, issued in corresponding International Application No. PCT/IB2014/062169, filed Jun. 12, 2014, 3 pages.

* cited by examiner

METHOD FOR EDGING COMPOSITE PANELS, STRIP FOR IMPLEMENTING THE METHOD AND PANEL OBTAINED BY THIS METHOD

The invention relates to a sealing edging method for composite panels that can be used as flooring or lining elements of inner aircraft walls. The invention also relates to a sealing strip for the implementation of the method and a panel obtained by this method.

In many sectors, especially aerospace, reduced weight is of major concern for improving the energy efficiency of aircraft.

Reduced weight is usually at odds with the other major concern in these sectors: mechanical strength.

In the example of an aircraft many elements are made of composite materials that combine low weight and increased strength.

Currently, the flooring or the wall trim elements are mainly made of composite panels comprising a central honeycomb core and two "skins" fixed on either side of the honeycomb. These skins comprise one or more layers of identical or different materials, as shown in FIG. 1.

In this figure, the panel shown comprises:
- a honeycomb core 1 of poly(p-phenylene terephthalamide) on either side of which are disposed two skins, each comprising:
- an inner ply 2, 3 in contact with the honeycomb core 1, and comprising:
  - a sheet 2a, 3a of fibreglass E impregnated with at least 70% by weight of epoxy resin, and with a weight less than or equal to 30 g/m$^2$, wherein the sheet 2a, 3a is in contact with the honeycomb core 1; and
  - a web 2b, 3b of unidirectional carbon fibres oriented in a first direction, having a modulus of elasticity between 275 and 300 GPa, and a weight less than or equal to 100 g/m$^2$, and impregnated with between 30% and 40% by weight of an epoxy resin;
- an outer ply 4, 5, in contact with the corresponding inner ply 2, 3, comprising:
  - a sheet 4a, 5a of unidirectional carbon fibres oriented in a second direction different from the first direction of the sheet 2b, 3b of carbon fibres of the inner ply 2, 3, having a modulus of elasticity between 275 and 300 GPa, and a weight less than or equal to 100 g/m$^2$, and impregnated with between 30% and 40% by weight of an epoxy resin, wherein the sheet 4a, 5a of unidirectional carbon fibres of each outer ply 4, 5 faces the ply 2b, 3b of the unidirectional carbon fibres of the corresponding inner ply 2, 3; and
  - a sheet 4b, 5b of fibreglass E with a weight less than or equal to 30 g/m$^2$, and impregnated with at least 70% by weight of epoxy resin.

Other composite panels may be edged with the method according to the invention.

Currently, the edging of a composite panel is implemented by using a two-component edging resin of the CF230/238 type from Axson© having a density of 0.68 (680 kg/m$^3$).

To ensure mechanical strength and sufficient holding power, this resin requires a trepanning of the honeycomb core of the composite to a depth of at least 3 mm. The resin surface condition is obtained by using a flat spatula to smooth the edging but it is often necessary to use machining to ensure an acceptable finish.

In order to improve the drying time of the resin, it is necessary to pass the entire composite in an oven for 5 hours, The method according to the prior art thus has the following drawbacks:
- a weight too high per linear meter (20 g per meter for a panel thickness of 10 mm).
- the requirement to machine the honeycomb in preparation for the application of the resin.
- a very long drying/passage time in the oven and requiring suitable storage.
- optional machining, but almost always implemented, of the resin edging for the surface condition required by the manufacturers.

The invention therefore aims to propose an edging method that is faster, more efficient and easier to implement by requiring fewer steps in order to obtain a panel that is lighter compared to the same panel using the edging method of the prior art.

To this end, the invention relates to a sealingly edging method of a composite panel comprising:
- a step (a) providing a composite panel of a specified thickness having two planar surfaces and a side to be edged, and provision of a sealing strip of polymeric material with a width greater than the thickness of the composite panel, and having a first surface, called the "inner" surface and a second surface, called the "outer" surface, in reference to the position of use;
- a step (b) for the application of the strip and an adhesive on the side and on a peripheral portion of the planar surfaces of the composite panel so that the adhesive is located between the composite panel and the inner surface of the strip, which sealingly protects the composite panel against dust, foreign matter or moisture uptake.

According to other implementations:
- the strip provided in step (a) may include an inner surface having an adhesive protected by a removable protective film layer, wherein step (b) comprises the following substeps:
  - a step (b1) of removal of the protective film from the strip to expose the adhesive
  - a step (b2) of application to the inner face of the strip carrying the adhesive layer on the side and on a peripheral portion of the planar surfaces of the composite panel;
- the strip provided in step (a) may comprise an inner surface free of adhesive, wherein the step (b) comprises the following substeps:
  - a step (b'1) of deposition of an adhesive directly on the side and on a peripheral portion of the planar surfaces of the composite panel;
  - a step (b'2) of application of the inner face of the strip on the adhesive layer carried by the side and by a peripheral portion of the planar surfaces of the composite panel:
- the edging method may comprise, in addition, a step (α) of deposition of an non-stick coating on the outer surface of the strip, wherein the step (α) is carried out before step (b);
- the edging panel may have at least a projecting corner, wherein the method further comprises a step (β) of localised removal of the non-stick coating at the projecting corners in order to create localised areas where there is no non-stick coating, and a step (γ) of bonding the strip on itself at the corners free of the non-stick coating;
- step (b) is implemented by a machine comprising at least a first applicator roller, called "side roller" coming into contact with the side of the composite panel, and at least two applicator rollers, called "surface rollers" which come into contact with the peripheral portion of the planar surfaces of the composite panel and which are substantially perpendicular relative to the side roller.

The invention also relates to a composite panel sealing edging strip for implementing the method according to the invention, wherein the strip is formed of a polymer material and comprises, on one side, an adhesive layer protected by a protective strip, wherein the strip is adapted to sealingly protect the composite panel against dust, foreign matter or moisture uptake.

According to other implementations:
the surface not carrying the adhesive may have an non-stick coating having a peeling strength of less than or equal to 1 N/25 mm, measured according to the standard ASTM D 1781.
the polymer material may be poly(ethylene terephthalate) (PET), wherein the strip has a thickness of 50 µm±2 µm.

The invention also relates to a composite panel having a sealing edging strip bonded by an adhesive over its entire side and a peripheral portion of its two planar surfaces, wherein the strip is made of a polymer material and is intended to sealingly protect the composite panel against dust, foreign matter or moisture uptake.

The invention also relates to a machine for implementing the method according to the invention, wherein the machine comprises at least a first applicator roller, called "side", intended to come into contact with the side of the composite panel to be edged, and at least two application rollers, so-called "surface", intended to come into contact with the peripheral portion of the planar surfaces of the composite panel, wherein these two surface rollers are substantially perpendicular with respect to the side in the operative position of the roller.

Other features of the invention emerge from the detailed description given hereinafter with reference to the appended drawings which represent, respectively:

The invention is based on the idea of replacing the edging resin by a strip stuck on the side, but also on a peripheral portion of the panel. This strip may be pre-stuck during manufacture, or it may be deposited on a layer of adhesive deposited on the side and on a peripheral portion of the panel during the edging.

The method of edging a composite panel according to the invention comprises a step (a) providing a composite panel having a specified thickness e, having two planar surfaces and a side to be edged, and providing a polymer material strip with a width $L_R$ greater than the thickness e of the composite panel.

Figure 1:
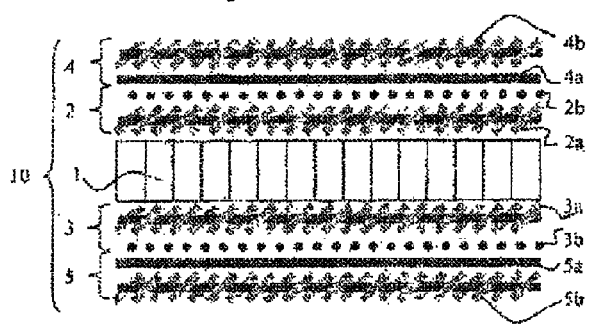
FIG. 1 shows a schematic sectional view of a composite panel used in the edging method according to the invention.
Figure 2:
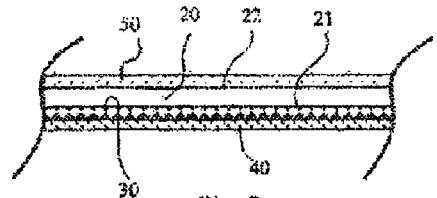
FIG. 2 shows a schematic sectional view of a polymer material strip for the implementation of the method according to the invention.

As shown in FIG. 2, the strip 20 has a first surface 21, called "inner" and a second face 22, called "outer" in reference to the position of use.

Figure 3:
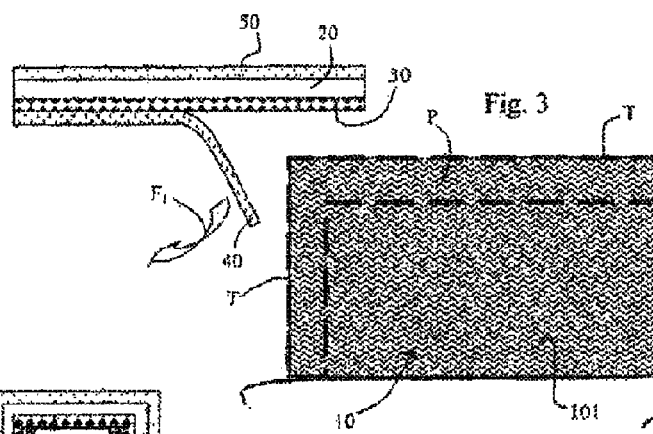
FIG. 3 shows a schematic plan view from above of a part of a composite panel on the side on which a strip according to the invention is being laid.

The edging method also comprises a step (b) for the application of the strip 20 and an adhesive 30 on the side T and on a peripheral portion P (defined in FIG. 3 by the dashed area) of the planar surfaces 101 of the composite panel 10 so that the adhesive 30 is located between the composite panel 10 (the side T and the peripheral portion P) and the inner surface 21 of the strip 20.

According to a first embodiment, the strip provided in step (a) comprises an inner surface free of adhesive, and step (b) comprising the sub-steps (b'1) of deposition of an adhesive directly on the side and on a peripheral portion of the planar surfaces of the composite panel, and (b'2) of application of the inner surface of the strip on the adhesive layer carried by the side and a peripheral portion of the planar surfaces of the composite panel.

This embodiment has the advantage of using a strip that is very simple to manufacture. Nevertheless, it is necessary to proceed in two stages: one for the adhesive deposition and one for the deposition of the strip.

According to a second preferred embodiment, the strip provided in step (a) comprises (see FIG. 2) an inner surface 21 having an adhesive layer 30 previously deposited during manufacture of the strip (e.g. by coating) and advantageously protected by a removable protective film 40.

Figure 4:
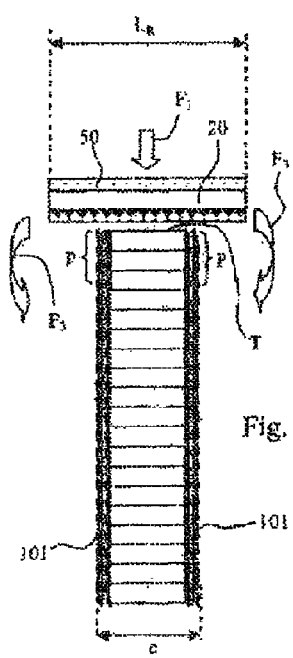
FIG. 4 shows a schematic sectional view of a part of a composite panel on the edge of which a strip according to the invention is being laid.
Figure 5:
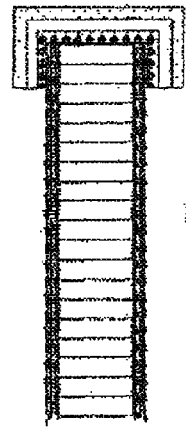
FIG. 5 shows a schematic sectional view of a part of a composite panel on the edge of which a strip according to the invention is laid.

In this case, step (b) comprises the substeps (b1) of withdrawal of the protective film 40 (see FIG. 3, the removal is carried out according to the arrow F1) from the strip, if present, in order to expose the adhesive, and (b2) of application to the inner surface of the strip carrying the adhesive layer on the side (see FIG. 4, the application is carried out according to the arrow F2) and a peripheral portion of the planar surfaces of the composite panel (see FIG. 4, the application is carried out according to the arrows F3). To ensure the fixing of the strip on the peripheral portions P, it has a width $L_R$ greater than the thickness e of the panel (see FIG. 4). Preferably, the ratio of the width $L_R$ of the strip 20 and the thickness e of the panel is between 2 and 3, i.e. the width of the adhesive covering the peripheral portions P is equal to at least half the minimum thickness e of the panel and may be up to the width e.

Preferably, the method according to the invention further comprises a step (α) of deposition of a non-stick coating based on silicone 50 on the outer surface 22 of the strip 20. This coating has the function of decreasing the adhesion of the outer surface 22 of the strip 20 when adding a sealing strip between the panels. The goal is to avoid accidentally removing the strip edging upon removal of the panel.

Thus, the surface not carrying the adhesive but having a non-stick coating has a peel strength less than or equal to 1 N/25 mm, measured according to the standard ASTM D 1781.

The non-stick treatment is carried out after deposition of the adhesive on the inner surface of the strip, so that the adhesive can adhere to the strip.

A removable protective film 40 is arranged above the adhesive to ensure non-pollution of the latter by the non-stick treatment.

Step (α) is carried out before step (b).

When the edging panel 10 has a projecting corner, the deposition of the strip generates folds at the corners. To this end, the method comprises a step (β) for the localised removal of the non-stick coating at the projecting corners in order to create localised areas without a non-stick coating, and a step (γ) of bonding the strip on itself at the corners without a non-stick coating. Local cutting of the strip can be performed to facilitate the folding thereof.

The non-stick coating may be removed chemically from the surface of the strip by using products such as (methyl-ethyl-ketone), D5-Clean or DPLF.

Figure 6:
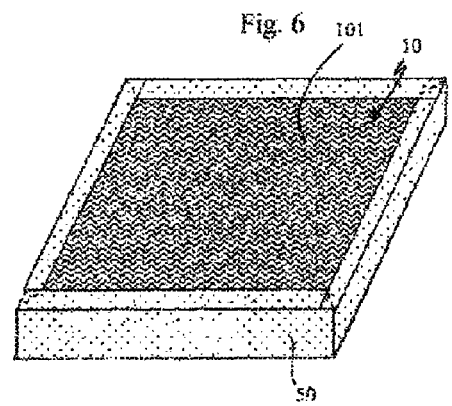
FIG. 6 shows a schematic perspective view of a composite panel according to the invention comprising an edging strip over its entire side and a peripheral portion of the two planar surfaces.

The composite panel obtained after the implementation of the method according to the invention is shown in FIG. 6 and has a edging strip over its entire side and a peripheral portion of the two planar surfaces.

A particularly suitable strip for implementing the method consists of a polymer material, preferably poly(ethylene terephthalate) or PET, and comprising, on one surface, an acrylic-based adhesive layer protected by a protective film.

In order to reduce the weight while ensuring the mechanical and aesthetic properties required by manufacturers, the PET strip preferably has a thickness of 50 µm±2 µm.

The use of this strip allows edging of the composite panels to protect the core material thereof against dust, foreign substances or moisture uptake (the strip ensures sealing once the latter is placed on the side and the peripheral portion P of the planar surfaces of the panels).

It is to be noted that this sealing strip according to the invention has a solid structure, i.e. unperforated, unlike a strip in the form of braid or mesh, for example.

The strip assembly with its non-stick treatment and its deposition adhesive does not exceed 115 g/m². The weight of each component is as follows:

PET strip thickness 50 µm with non-stick coating: weight 70 g/m²
Acrylic-based adhesive (coating on PET): weight 45 g/m²

It is considered that the weight of the protective film is not an important factor because it is removed during installation.

In addition to an intrinsic weight, the edging strip according to the invention meets the following mechanical and dimensional constraints to ensure its holding when in use on an aeronautical composite panel:

Complete strip assembly thickness (adhesive+PET film): 95 µm±2 µm
PET film thickness: 50 µm±2 µm
Peel strength on an aluminium plate: greater than or equal to 9.5 N/25 mm according to the standard ASTM D 1781.
Peel strength on an aluminium plate after ageing for one week (168 hours) at 70° C. and with a relative humidity of 95%: about 20 N/25 mm according to the standard ASTM D 1781.
Peel strength on the non-stick part: less than or equal to 1 N/25 mm according to the standard ASTM D 1781.
tensile strength (width 25 mm): 185 N
elongation at break less than or equal to 120%.

PET strip may be obtained in several colours, but should generally retain an opacity that cannot be seen through, with the aim of hiding the core of the composite panel and providing additional perceived quality.

The strip is self-extinguishing according to the standard FAR 25.853 Appendix F side (a)(I)(i).

Advantageously, the use of edging strip allows implementation of a part of the procedure by a dedicated application machine.

The application machine allows the edging strip to be laid on the side of a panel and on a peripheral portion P of the upper and lower surface (simultaneous application), in a short time via the action of an operator. To this end, this machine comprises at least one first applicator roller, called "side roller" for applying the strip on the side and at least two rollers, called "surface rollers", intended to come into contact with the peripheral portion of the planar surfaces of the composite panel, wherein these two surface rollers are substantially perpendicular with respect to the side in the operative position of the rollers, i.e. in the application position of the strip.

Moreover, the machine comprises a system for withdrawal of the adhesive protection film arranged in front of the rollers in order to remove the protective film before applying the strip.

The application on the entire side of the panel is made in one pass in order to limit the cutting and reversals of the strip (reducing the risk of loss of sealing) but also to limit the loss of time setting up the machine on the panel.

Only angles undergo manual processing with stripping of the folding zone (M.E.C. stripping, D5-Clean or DPLF or mechanical stripping) of the edging strip on itself by the operator at the end of the machine operation:

This stripping is required in order to remove the non-stick treatment from the folding zone of the strip on itself.

The table supporting the panel during the application is a table on which there are suction cups which may be positioned horizontally or vertically (the intermediate positions are also possible) according to the need of the operator and depending on the size of the panel to be edged.

As it is used by an operator, the taping machine should not exceed 5 kg in weight to allow it to be handled without support or outside assistance.

An articulated and balanced support arm may be attached to the machine in order to improve the ergonomics (lower maximum loads).

Advantageously, the strip machine according to the invention has an application head with adaptable width allowing the edging of panels of different thicknesses, typically from 8 mm to 12 mm.

This head may also receive rolls of strip that can measure 15 mm to 35 mm wide for a full roll with a diameter up to 150 mm (chuck included in the roll). The mandrel diameter is 76 mm±1 mm.

The machine allows strip application speeds up to 10 m/min. When laying, the machine can automatically remove the protective film on the adhesive side of the strip and thus save time.

The covering on the peripheral portion P of the planar surfaces of the panel is advantageously symmetrical on each side. The machine should allow a strict tolerance of symmetry throughout the laying of the strip with a maximum offset of 1 mm.

The application of the strip on the side and on the peripheral portion of the two planar surfaces is mandatory, otherwise there may be separation of the strip. This also ensures sealing of the bonding in order to protect the honeycomb.

The function of this complete bonding is also to permit the application of a laying tension in order to tighten the strip. This tension may be between 5 N and 25 N in order to ensure a quality implementation of the edging strip (reversals, folds, bubbles . . . ).

Thanks to the invention, it is no longer necessary to machine the honeycomb in advance, and the laying step is simplified, especially if the strip used is provided with an adhesive layer during manufacture.

In addition, it is possible to accomplish much of the edging method with the help of a machine to lay the strip, which accelerates the edging, makes it more consistent, and easier to implement.

Finally, the condition of the edging surface does not need to be treated mechanically because the outer surface of the strip fulfils the aesthetic requirements of manufacturers, including aircraft manufacturers, from the beginning.

The invention claimed is:

1. Method of sealingly edging a composite panel comprising the steps of:
   (a) providing a composite panel of specified thickness having two planar faces and a side to be edged, and providing a sealing strip of polymeric material, the sealing strip being separate from the composite panel and having a width greater than the thickness of the composite panel, and having a first inner surface and a second outer surface in reference to the position of use;
   (b) applying an adhesive on the side and at a peripheral portion of the planar surfaces of the composite panel and applying said sealing strip simultaneously on both the side and at the peripheral portion of the planar surfaces of the composite panel so that the adhesive is located between the composite panel and the inner surface of the sealing strip, which sealingly protects the composite panel.

2. Method of edging a composite panel according to claim 1, wherein the sealing strip provided in step (a) comprises an inner surface having a layer of adhesive protected by a removable protective film, wherein the step (b) comprises the substeps of:
   (b1) removing the protective film of the sealing strip to expose the adhesive; and
   (b2) applying to the inner surface of the sealing strip carrying the adhesive layer on the side and on a peripheral portion of the planar surfaces of the composite panel.

3. Method of edging according to claim 2, further comprising the step of
   (α) depositing a non-stick coating on the outer surface of the strip, wherein the step (α) is carried out before step (b).

4. Method of edging according to claim 3, wherein the edging panel has at least one projecting corner, and the method further comprises the step of
   (β) for the localised removal of the non-stick coating at the projecting corners in order to create localised zones that are free of the non-stick coating, and a step (γ) of bonding the strip on itself at the corners free of the non-stick coating.

5. Method of edging according to claim 3, wherein the non-stick coating has a peeling strength less than or equal to 1 N/25 mm, measured according to the standard ASTM D 1781.

6. Method of edging a composite panel according to claim 1, wherein the sealing strip provided in step (a) comprises an inner surface free of adhesive, wherein the step (b) comprises the following substeps:
   (b'1) depositing an adhesive directly on the side and on a peripheral portion of the planar surfaces of the composite panel; and
   (b'2) applying the inner surface of the strip on the adhesive layer carried by the side and by a peripheral portion of the planar surfaces of the composite panel.

7. Method of edging according to claim 1, wherein the step (b) is implemented by a machine comprising at least a first applicator side roller coming into contact with the side of the composite panel to be edged, and at least two application surface rollers, which come into contact with the peripheral portion of the planar surfaces of the composite panel, and which are substantially perpendicular relative to the side roller.

8. Method of edging according to claim 1, wherein the polymeric material is poly(ethyleneterephtalate) (PET), wherein the strip has a thickness of 50 μm±2 μm.

9. Method of edging according to claim 1, wherein the sealing strip is configured to sealingly protect the composite panel against dust, foreign matter or moisture uptake.

* * * * *

UNITED STATES PATENT AND TRADEMARK OFFICE
CERTIFICATE OF CORRECTION

PATENT NO. : 9,851,007 B2  
APPLICATION NO. : 14/899937  
DATED : December 26, 2017  
INVENTOR(S) : Le Lay et al.

Page 1 of 1

It is certified that error appears in the above-identified patent and that said Letters Patent is hereby corrected as shown below:

On the Title Page

Item (57), Line 6, "redefined" should read --predefined--

In the Claims

Column 8, Line 4, Claim 4, "for the localised" should read --localised--

Signed and Sealed this
Twelfth Day of June, 2018

Andrei Iancu
*Director of the United States Patent and Trademark Office*